US005515390A

United States Patent [19]
Benton

[11] Patent Number: 5,515,390
[45] Date of Patent: May 7, 1996

[54] ERROR DETECTION APPARATUS FOR AN ELECTRO-OPTIC DISPLAY

[75] Inventor: Geoffrey A. Benton, Essex, United Kingdom

[73] Assignee: Gilbarco Limited, Essex, United Kingdom

[21] Appl. No.: 229,083

[22] Filed: Apr. 18, 1994

[30] Foreign Application Priority Data

Apr. 22, 1993 [GB] United Kingdom ............ 9308294

[51] Int. Cl.$^6$ .................................................. G06F 11/00
[52] U.S. Cl. .................. 371/57.1; 371/24; 371/67.1; 324/73.1; 345/33; 345/34; 345/41; 345/50; 345/87
[58] Field of Search .......................... 371/57.1, 3, 21.2, 371/24, 25.1, 29.1, 67.1; 324/73.1, 158.1; 345/33, 34, 38, 41, 50, 81, 82, 87; 340/781, 813, 715

[56] References Cited

U.S. PATENT DOCUMENTS

| 4,247,852 | 1/1981 | Utzinger | 340/715 |
|---|---|---|---|
| 4,311,993 | 1/1982 | Strobel | 340/641 |
| 4,511,894 | 4/1985 | Johnston | 340/756 |
| 4,734,688 | 3/1988 | Adams | 340/715 |
| 4,951,037 | 8/1990 | Goossen | 340/715 |
| 4,970,503 | 11/1990 | Principe et al. | 340/825.060 |
| 5,093,654 | 3/1992 | Swift et al. | 340/781 |
| 5,160,920 | 11/1992 | Harris | 340/765 |

Primary Examiner—Robert W. Beausoliel, Jr.
Assistant Examiner—Dieu-Minh Le
Attorney, Agent, or Firm—Lowe, Price, LeBlanc & Becker

[57] ABSTRACT

An apparatus for and method of detecting errors in an electro-optic display of a type comprising one or more capacitive display elements. Each display element is connected to drive circuitry. The apparatus includes an isolator for electrically isolating the first electrode of a display element to be tested from the drive circuitry. A comparator compares a voltage on the first electrode of the element being tested with a reference voltage, and an error signal generator generates an error signal if the voltage on the first electrode crosses the reference voltage within a predetermined period of time.

11 Claims, 3 Drawing Sheets

ERROR DETECTION APPARATUS FOR AN ELECTRO-OPTIC DISPLAY

BACKGROUND TO INVENTION

This invention relates to apparatus for, and a method of, detecting error conditions in electro-optic displays and their associated drive circuitry.

In certain applications, such as the dispensing of fuel, stringent requirements as to the accuracy and integrity of the display components are laid down. In particular the relevant authorities stipulate that a system of error detection be incorporated to warn the operator of a display error or to halt the dispensing of fuel when such a condition is detected.

Within an electro-optic display and associated drive circuitry, there are a number of errors or fault conditions that can arise including: (i) open or short circuits in connections between the driver devices and electrodes of the display; (ii) open or short circuits within the display electrodes or their interconnections; or (iii) failure of the driver devices resulting in the display's electrodes being driven by incorrect drive levels. Such conditions could result in a display which appears to be operating correctly when in fact it is indicating an incorrect value.

Various error detection schemes have formerly been proposed including methods for optically scanning the display or monitoring the electrode voltage via additional connections to the display electrodes. Such schemes tend to be complex and relatively expensive due to the additional circuitry required. Also if an additional connection is required then a special display has to be used.

Other methods provide checking of the input data or drive levels to the display electrodes; however, such an arrangement cannot take account for failures within the display device itself.

This invention provides error detection apparatus for an electro-optic display of the type in which drive circuitry applies a drive voltage across a capacitive display element, the apparatus comprising means for electrically isolating an element from the drive circuitry, means for monitoring a potential difference across the element when it has been isolated and means for generating an error signal if the potential difference is below, or in a pre-determined period decays below, a reference voltage.

The invention may advantageously be employed with liquid crystal or electro-luminescent displays.

By employing the present invention it is possible to detect errors arising out of open or short circuit failures in the drive circuitry as well as open or short circuit failures within the electro-optic display, or the connections thereto.

Advantageously the drive voltage is applied across drive electrodes of the element, and the potential difference across the drive electrodes is monitored. This enables the present invention to be used with any conventional electro-optic display of the type mentioned.

Preferably the isolating means is provided by the drive circuitry which includes a switchable high impedance output state. Once set to this state the potential difference across the element can be monitored.

The present invention lies in the realization that error detection can be implemented by exploiting the capacitance of the display element and monitoring the potential difference on the display's drive electrodes. However, small parasitic capacitances may, in some applications, be associated with the drive or test circuitry, and this may maintain sufficient voltage to mask any potential difference associated with the display element. This can be a problem with open circuit faults in the connections to the display or open circuit faults within the display itself. To overcome this a resistor is preferably connected across the element. The value of the resistor is selected to ensure that, in the absence of a fault condition, the potential difference across the combined parasitic and display element capacitance does not decay below the reference voltage in the pre-determined period. However the parasitic capacitance alone (i.e. in an open circuit fault condition) is not sufficient to prevent the voltage decaying below the reference voltage in the pre-determined period, and therefore employing the resistor avoids the parasitic capacitance masking a fault condition.

Where it is required to be able to detect open circuit fault conditions even when the display is in an "off" state (i.e. when there is no drive voltage across the display element), it is desirable to connect a first end of a resistor to an electrode of the display element and the second end to a bias voltage. The bias voltage may be chosen to be an inverse of the drive voltage or a fraction of the drive voltage. With such an arrangement the potential difference across the element will tend towards the bias voltage when the element is isolated.

Advantageously the potential difference is monitored using a voltage comparator having a first input connected to an electrode of the element and a second input connected to the reference voltage. The reference voltage is preferably a fraction of the drive voltage.

In certain types of electro-optic displays, for example liquid crystal displays, it is preferable to drive the display dynamically by cyclically switching the drive voltage polarity to maintain the display element in a given state. Such a drive arrangement prevents polarisation of the liquid crystal. When the drive voltage polarity is cyclically switched the potential difference should be monitored between switching transitions. Furthermore it is desirable to successively monitor the potential difference on opposite drive voltage polarities, so that the process of monitoring does not polarise the liquid crystal.

According to a second aspect of the invention there is provided a method for detecting errors in an electro-optic display comprising applying, by means of drive circuitry, a drive voltage across a capacitive display element; isolating the element from the drive circuitry; monitoring a potential difference across the element when it has been isolated; comparing the monitored potential difference with a reference voltage; and generating an error signal if the potential difference is below, or in a pre-determined period decays below, a reference voltage.

BRIEF DESCRIPTION OF DRAWINGS

The invention will now be described by way of example only with reference to the accompanying drawings in which.

DETAILED DESCRIPTION OF THE PREFERRED EMBODIMENTS

Figure 1:
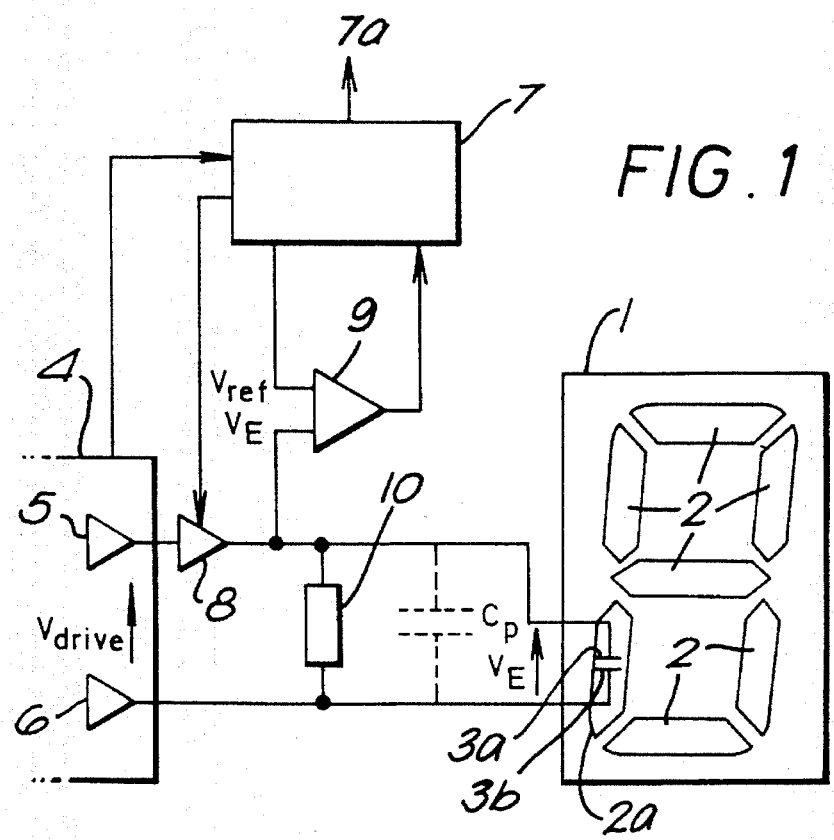
FIG. 1 is a schematic representation of error checking apparatus constructed in accordance with the invention.

Referring to FIG. 1, there is shown a liquid crystal display (LCD) 1 comprising a number of elements or segments 2. Each element 2 has drive electrodes 3a and 3b (only electrodes for element 2a are shown) which are driven by associated drive circuitry 4 (only drive circuitry for element 2a is shown). The drive circuitry 4 contains drivers 5 and 6 which apply the appropriate drive voltage $V_{drive}$ to the drive electrodes 3a and 3b.

The display elements 2 can be driven directly as shown in FIG. 1, or using a multiplexed arrangement, both techniques being known in the art. Within the present example driver 6 is the backplane driver and is common to all the elements 2, whilst driver 5 is associated only with element 2a. The drivers 5 and 6 generate two different drive voltages $+V_{drive}$ ('high') and $-V_{drive}$ ('low'). When the LCD element is being driven 'on' driver 5 will generate a 'high' voltage drive level whilst driver 6 generates a 'low' voltage drive level and vice versa. In an 'off' state drivers 5 and 6 will both generate either 'high' or 'low' voltage drive levels simultaneously. To prevent polarising the display elements 2 by continuously applying a dc voltage, the LCD is driven dynamically. That is, for a given state the voltage polarity of both drivers 5, 6 are cyclically switched between alternate states, typically at a drive frequency of 60 Hz.

To check for an error within a particular display element, in this example element 2a, or group of elements in the case of a multiplexed display, the drive to the corresponding element is monitored by control circuit 7, and then electrically isolated by isolating means 8, under the control of control circuit 7.

The isolating means 8 can be incorporated into the driver 5 of the drive circuitry 4 by using a driver with a third switchable high impedance output state.

During the period that the element is isolated the electrode potential difference $V_E$ is maintained by the capacitance associated with the element's drive electrodes 3a and 3b. By means of comparator 9 the control circuit 7 monitors this voltage and compares it with the voltage characteristic expected for the display in its current state. When an incorrect electrode potential is detected the control circuit 7 generates an error warning 7a, which in certain applications, such as the fuel dispenser, can automatically prevent further operation until the fault is rectified.

As discussed earlier, the LCD is driven dynamically, therefore when testing the LCD the driver 5 is isolated and the electrode potential difference $V_E$ monitored between drive switching transitions. To prevent introducing a dc offset by the interruption of the drive voltage, testing is carried out during opposite drive polarities. Alternatively the test period $T_S$ can be made small relative to the period between switching transitions, for example, a 1 ms test period compared to 10 ms between switching transitions.

In the embodiment depicted in FIG. 1, the comparator 9 compares the electrode potential difference $V_E$ with a reference voltage $V_{REF}$. Voltage comparator 9 and driver 5 can be implemented using a single bi-directional logic device in which case the reference voltage represents the logic threshold level of the device in the input mode.

In addition to the capacitance across the display element, there are also small parasitic capacitances associated with the drive circuitry 4, voltage comparator 9 and the interconnection therebetween. These combined parasitic capacitances are depicted in FIG. 1 by a parasitic capacitance Cp.

In a fault condition such as an open circuit failure in the connections to, or within, the drive electrodes 3a and 3b of the LCD, the capacitance of the LCD's drive electrode is absent and the parasitic capacitance Cp could maintain sufficient charge to mask the fault condition. This is prevented by a resistor 10, connected across the drive electrodes 3a and 3b. This allows controlled discharge of the parasitic capacitance Cp when the LCD drive electrode capacitance is absent (i.e. the element is open circuit). When the display is functioning correctly and the LCD's drive electrode capacitance is present, which is large relative to the parasitic capacitance, the potential difference $V_E$ does not fall below the expected value within the test period.

Figure 2:
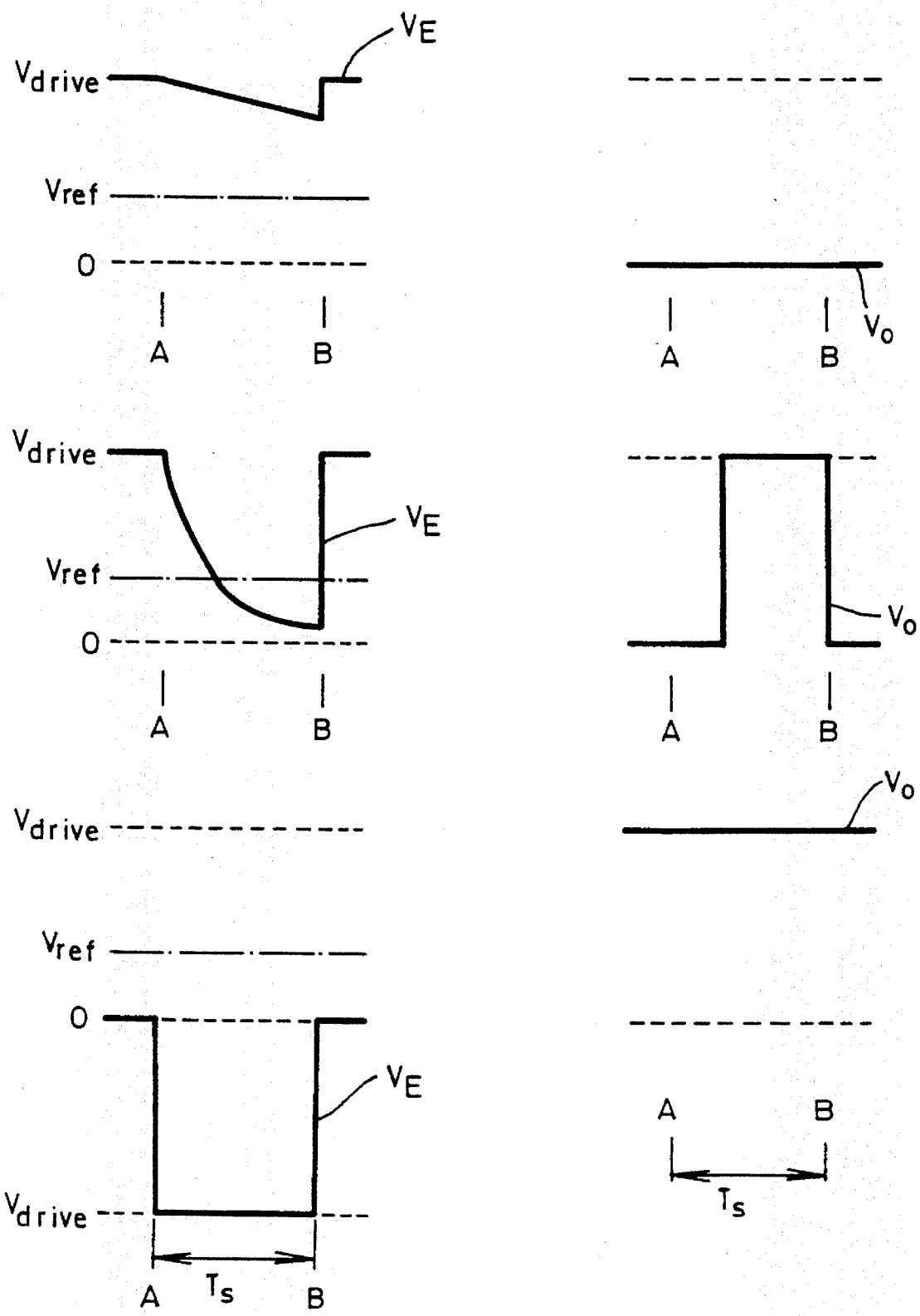
FIGS. 2(a)–2(c) shows, the voltage waveforms at the comparator input and output of FIG. 1 for various circuit conditions.

Referring to FIG. 2 there is illustrated the electrode potential difference $V_E$ at the input of the comparator and the corresponding comparator output voltage $V_O$ for an LCD which is being driven in an 'on' state using the circuit of FIG. 1. For the purposes of the illustration the driver 5 is depicted as being driven 'high' ($+V_{drive}$) while driver 6 is 'low' ($-V_{drive}$), though the description applies equally when the drive polarities are reversed.

At point A the display element 2a to be tested is electrically isolated and the electrode potential difference $V_E$ monitored. For a correctly functioning element (FIG. 2a) the electrode potential difference across the combined capacitance of the element and the parasitic capacitance Cp begins to discharge via the resistor 10. The sampling period $T_s$, the value of the resistor 10 and the reference voltage $V_{REF}$ are selected with reference to the capacitance of the LCD element such that at the end of the sampling period (point B) the electrode potential difference $V_E$ still remains above the reference voltage $V_{REF}$ and the comparator output $V_O$ remains low. The reference voltage is selected to be a proportion of the drive voltage $V_{drive}$, and in this example it is a fraction (approximately ⅓) of the voltage produced by driver 5. If the electrodes or connection to the display fail open circuit (FIG. 2b) only the smaller remaining parasitic capacitance Cp is present and this discharges correspondingly quicker such that the electrode voltage falls below the reference voltage during the sampling period $T_S$, and the comparator output changes state indicating the presence of a fault condition.

When a short circuit failure in the display or interconnection to the display occurs (FIG. 2c) the electrode potential difference is pulled down to the drive voltage of the backplane driver 6, i.e. $-V_{drive}$, when the element is isolated. The electrode potential consequently falls below the reference voltage indicating a fault condition.

Figure 3:
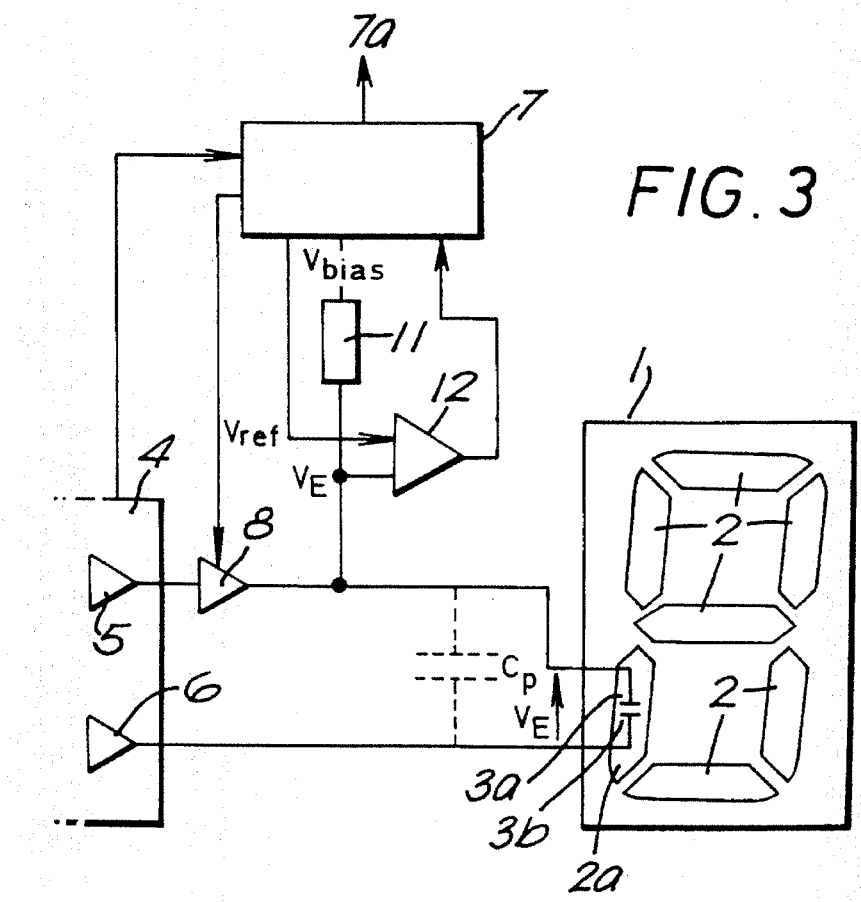
FIG. 3 is a schematic representation of an alternative error checking apparatus constructed in accordance with the invention.

Referring to FIG. 3, there is illustrated an embodiment wherein an open circuit fault condition in both the 'on' and the 'off' state can be detected. In this arrangement a resistor 11 is connected between a bias voltage source and the drive electrode 3a of the display element 2a. The bias voltage $V_{BIAS}$ is the inverse of the drive voltage, but could be any voltage distinct from the bias voltage.

The circuit operation in the 'on' state is similar to that previously described, with reference to FIGS. 1 and 2, however open circuit error conditions are now also detected in the 'off state'. In the absence of a fault condition, when the drive voltage to the element is interrupted and the element is in the 'off' state the combined capacitance of the parasitic and electrode capacitances begin to charge and the electrode voltage at the input of the comparator moves away from zero volts towards that of the bias voltage, in this example $+V_{drive}$. The charging rate and hence the rate of increase of $V_E$ depend on the value of the resistor 11 and the presence of the capacitance across the display element. Consequently when an open circuit fault occurs the corresponding faster rise in $V_E$ will exceed the reference voltage in the sampling period and the error will be detected.

In the embodiments illustrated in FIGS. 1 and 3, error checking can be carried out continuously when the display is updated in the course of normal operation. Alternatively, the element's state may be switched momentarily to pre-determined state for the purposes of error checking.

Figure 4:
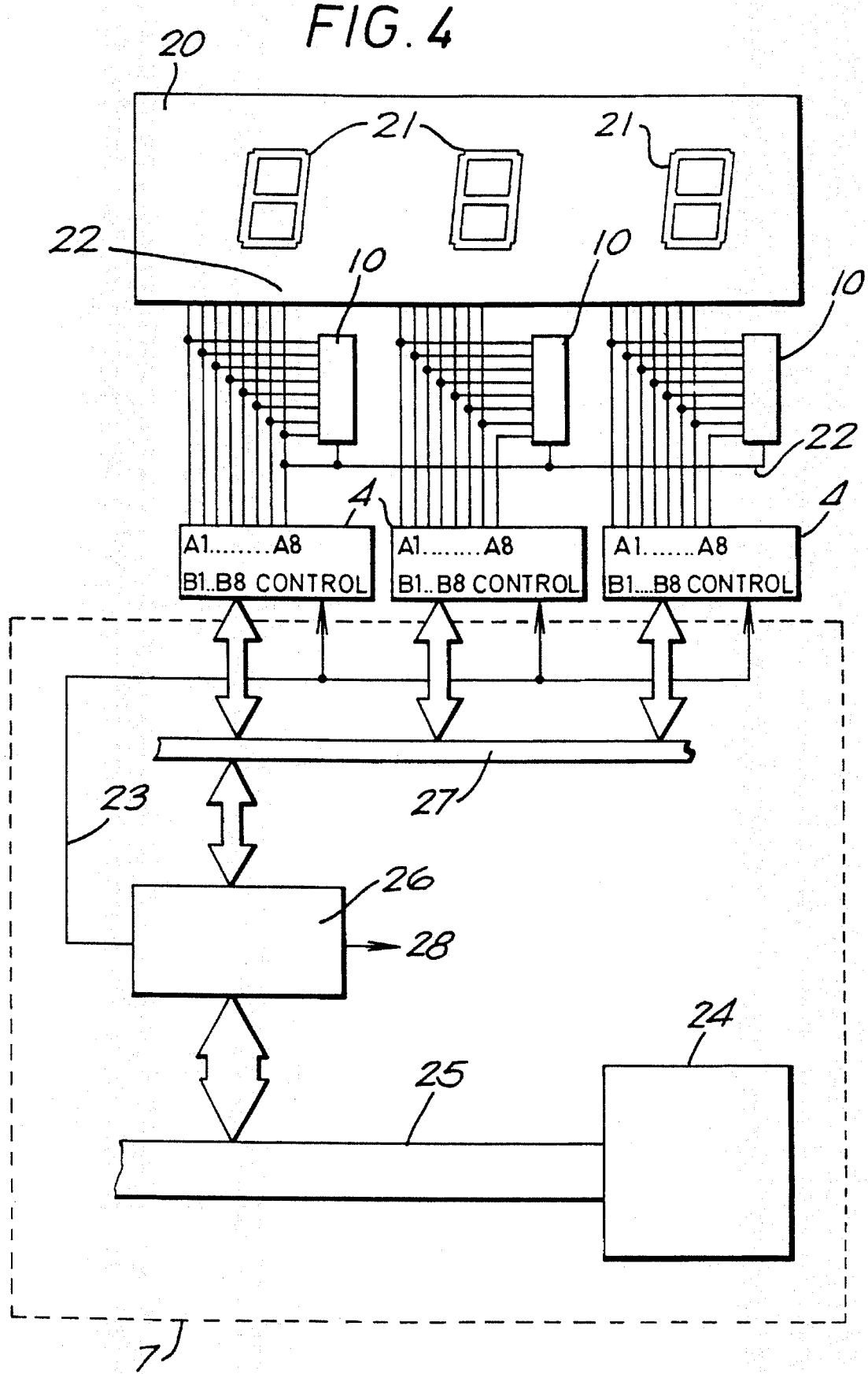
FIG. 4 is LCD driver circuitry in accordance with the invention.

The present invention is particularly suited to fuel dispensing operations where the relevant authorities stipulate stringent specifications for the accuracy and integrity of the display components. [FIG. 4 shows a fuel dispenser incorporating a display in accordance with the present invention. Control circuit 7 can be implemented using the existing central processing unit present in certain fuel dispensers]. FIG. 4 shows a liquid crystal display and associated drive circuitry for use in a fuel dispenser.

The circuit comprises a three digit seven-segment LCD 20, a drive circuit 4 associated with each digit 21 of the LCD 20 and a control circuit 7. In the present example the drive circuits 4 are 74HC646 CMOS devices which are 8 bit bus transceiver circuits with tri-state outputs. Each drive circuit 4 contains internal registers and is capable of transmitting data directly from either of data bus A (lines A1–A8) or data bus B (lines B1–B8) into, or out of, the internal registers in response to control information on control line 23. Lines A1–A7 of the bus A are used to drive the seven segments of the respective digits 21 and line A8 to drive the backplane 22 which is common to the three digits 21.

Co-packaged 1MΩ resistors 10 are connected between each of the lines A1–A8 and the backplane 22 to provide a discharge path during display testing.

The control circuit 7 comprises a central processor unit (CPU) 24 which controls the fuel dispenser via a 32 bit data bus 25 in a manner well known in the art. A display processor 26 is connected between the bus 25 and the drive circuits 4. Each drive circuit 4 is connected to the display processor 26 by means of an 8 bit data bus 27.

In operation the CPU 24 instructs the display processor 26 to update display 20 as fuel is being dispensed. In response the display processor 26 generates the correct data for lines A1–A8 for each digit and then cyclically clocks this data into the internal registers of the drive circuits. These data are clocked from the internal register onto data bus A to correctly energise the display digit.

Periodically the display processor 26 will perform an error check on the display by instructing all the driver circuits 4 to isolate the data bus A by switching lines A1 to A8 to a high impedance state. After the pre-determined sampling period $T_S$ the display processor 26 instructs each driver circuit 4 to read the logic state appearing on lines A1–A8 into its internal registers. The display processor 26 then cyclically reads the contents of each of these registers by means of bus 27 and compares them with expected values. In this particular example, the reference voltage $V_{REF}$ corresponds to the logic threshold of the driver circuit 4 and the resistors 10 are selected such that the voltage on the element electrode will remain above this threshold for a correctly functioning element. When an error is detected the display processor sets a flag 28 indicating that a fault condition has arisen. Upon detecting such a flag CPU 24 warns the operator and depending upon the severity of the fault may halt the dispensing of fuel.

In the foregoing description, testing of the display was carried out during normal operation in which the segments of each digit were tested in state they were currently driven at. It is also envisaged to perform display checks by energising all the elements.

Although the foregoing discussion has been directed towards a liquid crystal display (LCD) the present invention can equally be applied to any form of electro-optic display whose elements are capacitive, for example electro-luminescent displays. The test arrangement embodied in the present invention can also be applied to existing displays with a minimum of additional circuitry and reconnection.

What I claim is:

1. Error detection apparatus for an electro-optic display of a type comprising at least one capacitive display element, each display element connected to drive circuitry which applies a first drive signal, which alternates between two voltage states, to a first electrode of the display element and applies a second drive signal, which alternates between said two voltage states, to a second electrode of the display element, wherein said first and second drive signals are in phase for a display element to be in an "OFF" state and said drive signals are out of phase for a display element to be in an "ON" state, the apparatus comprising:

means for electrically isolating the first electrode of a display element to be tested from the drive circuitry, means for generating a bias voltage at a bias voltage terminal wherein said bias voltage is selected, during a test, to be distinct from the voltage state of the first drive signal of the element being tested, a resistor connected between said first electrode of the element being tested and said bias voltage terminal, means for generating a reference voltage, having a value between said bias voltage and said voltage state of the first drive signal of the element being tested, means for comparing a voltage on said first electrode of the element being tested with said reference voltage, and means for generating an error signal if said voltage on said first electrode crosses said reference voltage within a predetermined period of time wherein the value of the resistor and predetermined period are such that, when no fault condition exists, said voltage on said first electrode does not cross the reference voltage within the predetermined period.

2. Apparatus according to claim 1 wherein said bias voltage is an opposite voltage state of the first drive voltage of the element being tested.

3. Apparatus according to claim 1 wherein said bias voltage is the voltage state of the second drive signal of the element being tested.

4. Apparatus according to claim 1 wherein said bias voltage is a fraction of the voltage state of the first drive voltage of the element being tested.

5. Apparatus according to claim 1, wherein the display element to be tested is tested when the voltage state of the first display drive signal is in a first state and in which a subsequent test is performed on another voltage state of the first drive signal.

6. Apparatus according to claim 1 in which the isolating means is provided by the drive circuitry which includes a switchable high impedance output state.

7. Apparatus according to claim 1 in which the potential difference is monitored using a voltage comparator having a first input connected to said first drive electrode of the display element to be tested and a second input connected to a point at the reference voltage.

8. Apparatus according to claim 1 in which the reference voltage is a fraction of the voltage state of the first drive signal.

9. Apparatus according to claim 1 in which the electro-optic display is a liquid crystal display.

10. Apparatus according to claim 1 in which the electro-optic display is an electro-luminescent display.

11. A method for detecting errors in an electro-optic display of a type comprising at least one capacitive display element, each display element connected to drive circuitry which applies a first drive signal, which alternates between two voltage states, to a first electrode of the display element and applies a second drive signal, which alternates between said two voltage states, to a second electrode of the display element, wherein said first and second drive signals are in phase for a display element to be in an "OFF" state and said drive signals are out of phase for a display element to be in an "ON" state, the method comprising the following steps:

electrically isolating the first electrode of a display element to be tested from the drive circuitry, generating a bias voltage at a bias voltage terminal, connecting a resistor between said first electrode of the element being tested and said bias voltage terminal, wherein said bias voltage is selected, during a test, to be distinct from the voltage state of the first drive signal of the element being tested, generating a reference voltage, having a value between said bias voltage and said voltage state of the first drive signal of the element being tested, comparing a voltage on said first electrode of the element being tested with said reference voltage, and generating an error signal if said voltage on said first electrode crosses said reference voltage within a predetermined period of time wherein the value of the resistor and predetermined period are such that, when no fault condition exists, said voltage on said first electrode does not cross the reference voltage within the predetermined period.

\* \* \* \* \*